United States Patent [19]
Ubillos

[11] 3,743,920
[45] July 3, 1973

[54] PORTABLE ELECTRONIC CALCULATOR POWER SUPPLY

[75] Inventor: Peter Ubillos, Franklin, Mass.

[73] Assignee: Bowmar/Ali, Inc., Acton, Mass.

[22] Filed: July 17, 1972

[21] Appl. No.: 272,411

[52] U.S. Cl............................ 321/2, 321/11, 307/74, 307/151
[51] Int. Cl. .......................................... H02m 5/40
[58] Field of Search........................... 321/2, 11, 12; 307/151

[56] References Cited
UNITED STATES PATENTS

| | | | |
|---|---|---|---|
| 3,500,060 | 3/1970 | Cook | 307/151 |
| 3,192,464 | 6/1965 | Johnson et al. | 321/2 |
| 2,968,739 | 1/1961 | Mohler | 307/150 |
| 3,267,288 | 4/1966 | Maiden et al. | 307/48 X |
| 3,384,803 | 5/1968 | Hardin et al. | 307/11 X |
| 3,417,311 | 12/1968 | Logan | 321/2 |

Primary Examiner—William M. Shoop, Jr.
Attorney—Harold B. Hood, Ronald D. Welch et al.

[57] ABSTRACT

A power supply for use in a portable, hand-held calculator which comprises positive, negative, and reference terminals, and a plurality of batteries connected electrically in series between the positive and reference terminals. A means for generating a negative voltage is coupled to the batteries and between the negative and reference terminals, the generating means including an oscillator circuit having an input circuit coupled to the positive terminal, an output circuit, a rectifier circuit, and means coupling the rectifier circuit to the output circuit.

7 Claims, 1 Drawing Figure

Patented July 3, 1973
3,743,920
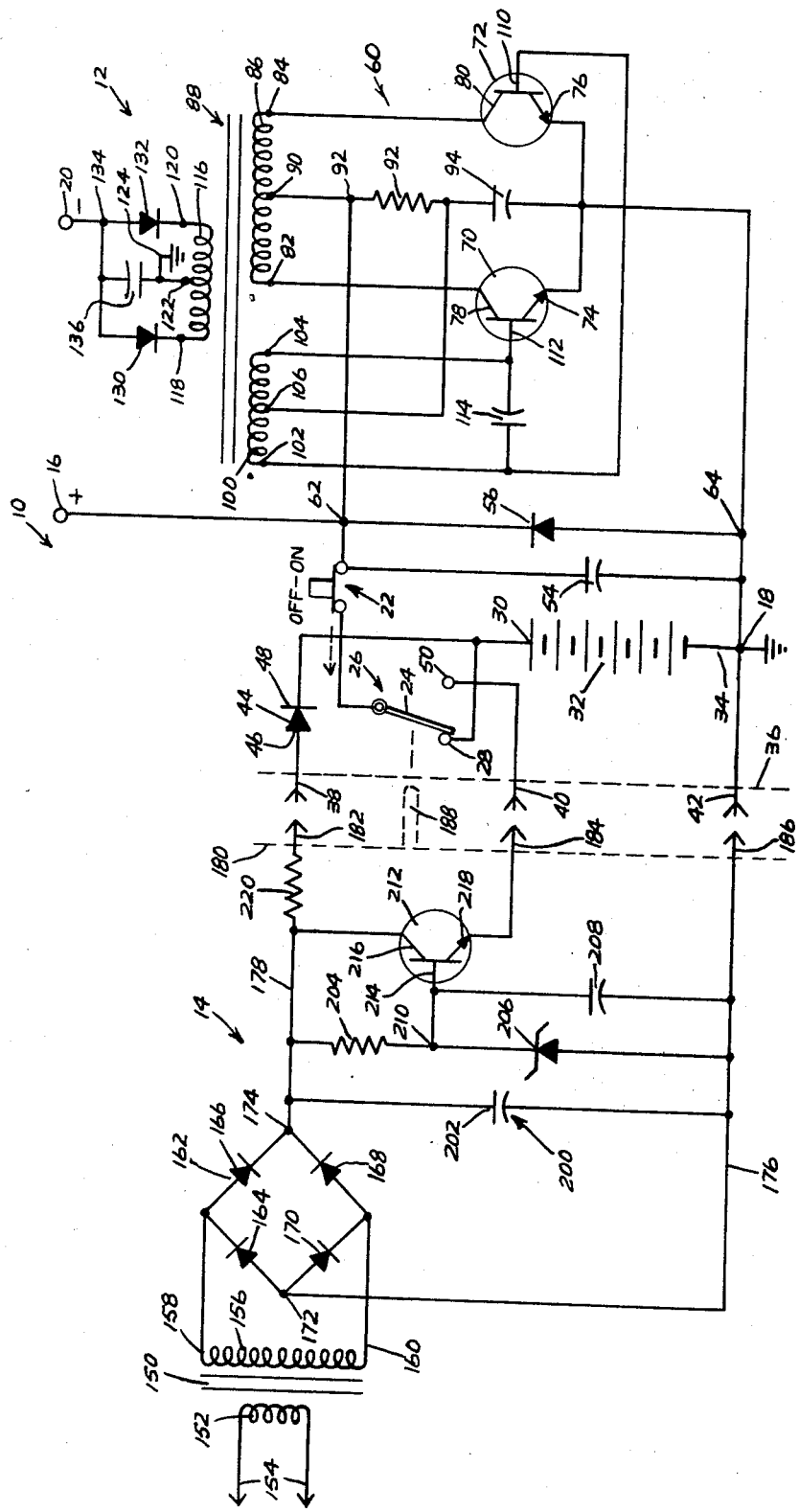

PORTABLE ELECTRONIC CALCULATOR POWER SUPPLY

BACKGROUND OF THE INVENTION

1. Field of the Invention

The present invention relates to direct current power supplies for small, portable electronic equipment such as a hand-held calculator, and in particular to such a power supply which utilizes batteries for generating a primary, positive voltage source and an oscillator circuit coupled to the batteries for generating a lower power negative voltage source.

2. Description of the Prior Art

Power supplies used to energize portable electronic equipment are well known, such power supplies typically utilizing batteries as their primary source of energy. In one type of power supply well known in the prior art, the batteries are used to energize the circuit directly, with proper voltages for the circuit being obtained by proper selection of the number of cells used. Positive and negative polarity sources are provided by using two sets of batteries. In another typical type of prior art power supply wherein higher voltages are required, it has been a common practice to use batteries as a primary source of energy and to couple thereto some form of a "chopper" or oscillator circuit and a transformer to attain the required voltages. This latter type of power supply has also been widely adopted for use in circuits which require both positive and negative voltage sources.

When both positive and negative polarity sources are required for operating a circuit, it is frequently the case that the positive and negative supplies are required to meet substantially different power requirements. Correspondingly, portable power supplies of the type utilizing batteries exclusively are unsatisfactory in that the one of the sources having smaller power requirement will typically be substantially oversized for the sake of standardizing the type of set or size batteries used.

In the type of power supply which utilizes a "chopper" to generate the positive and negative polarity sources, separate circuits must be provided to provide opposite polarity sources having different power capabilities. Further, in this type of circuit, valuable power is consumed within the oscillator circuits themselves.

SUMMARY OF THE INVENTION

Broadly, the invention is a power supply for use in a portable, hand-held calculator. The power supply comprises positive, negative, and reference terminals, and a plurality of batteries connected electrically in series between the positive and reference terminals. A means is provided for generating a negative voltage, the means being coupled to the batteries and between the negative and reference terminals. The generating means includes an oscillator circuit having an input circuit coupled to the positive terminal, an output circuit, a rectifier circuit, and means coupling the rectifier circuit to the output circuit.

This novel power supply circuit utilizes batteries to provide a first source of first polarity and the "chopper" circuit to provide a second source of opposite polarity. The battery source has a substantially higher power capacity than the "chopper" source. By using batteries directly for the higher power source, circuit losses are minimized. Similarly, by using an oscillator circuit for the lower power source, minimum power is consumed therein, and no need for different types of batteries, and no excessive power capacity results.

In one specific embodiment of the invention, there is also provided a disengageable charging module which includes means for charging the batteries of the power supply and means for supplying a positive polarity supply to operate an external circuit while the batteries are being charged.

It is therefore an object of the invention to provide an improved power supply for use in a portable, hand-held calculator circuit.

It is another object of the invention to provide such a power supply which provides positive and negative polarity sources.

It is still another object of the invention to provide such a power supply which provides positive and negative power sources having different load capacities with maximum efficiency.

It is another object of the invention to provide such a power supply wherein the higher capacity source is provided directly by a plurality of batteries and a lower capacity source is provided by an oscillator circuit operated from the higher source batteries.

It is still another object of the invention to provide such a power supply which includes a detachable circuit for selectively charging the batteries thereof.

It is yet another object of the invention to provide such a power supply which includes a charging module which also provides an alternate power supply for operating a circuit when the batteries of the power supply are being charged.

BRIEF DESCRIPTION OF THE DRAWING

The above-mentioned and other features and objects of this invention and the manner of attaining them will become more apparent and the invention itself will be best understood by reference to the following description of an embodiment of the invention taken in conjunction with the accompanying drawing of an electrical schematic of the power supply of the present invention.

DESCRIPTION OF THE PREFERRED EMBODIMENT

Referring now to the drawing, there is illustrated a power supply 10 for use with a portable, hand-held calculator circuit (not shown) such as, for example, the portable calculator circuit disclosed in U.S. Pat. application Ser. No. 256,286, filed May 24, 1972, by James H. Bunting and assigned to the same Assignee as the present invention which comprises a battery supply module 12 and a charging module 14.

Battery module 12 includes a positive terminal 16, a reference or ground terminal 18 and a negative terminal 20. A conventional "off-on" switch 22 is connected electrically in series between positive terminal 16 and the armature 24 of a single-pole, double-throw switch 26. The normally closed contact 28 of switch 26 is connected to the positive terminal 30 of a plurality of series connected battery cells 32. In a specific embodiment, cells 32 comprise six nickel cadmium batteries which provide a direct current potential of 7.2 volts. The negative terminal 34 of series connected cells 32 is connected to reference terminal 18.

A female plug indicated by dashed lines 36 includes three sockets 38, 40, and 42. A diode 44 has its anode 46 connected to socket 38 and its cathode 48 connected to battery positive terminal 30. The normally open contact 50 of switch 26 is connected to socket 40, and reference terminal 18 is connected to socket 42.

A filter capacitor 54 and a diode 56 are parallel connected between positive terminal 16 and reference terminal 18 as shown.

A transistor "chopper" or oscillator circuit 60 includes input terminals 62, 64 coupled to positive terminal 16 and reference terminal 18, respectively. Circuit 60 further includes a pair of transistors 70, 72, connected in push-pull configuration, emitters 74, 76 of transistors 70, 72, being connected in common and the collectors 78, 80 thereof being coupled together via the end taps 82, 84 of the primary or input winding 86 of a transformer 88.

Emitters 74, 76 are coupled to the center tap 90 of winding 86 via a series connected resistor 92 and capacitor 94. Transformer 88 further includes a feedback winding 100 having end taps 102, 104 and a center tap 106. Center tap 106 is connected at 95 to the commonly connected terminals of resistor 92 and capacitor 94, and end taps 102, 104 are connected to the bases 110, 112 of transistors 70, 72, respectively. A phase shifting capacitor 114 is coupled between bases 110, 112 as shown.

Transformer 88 further includes an output winding 116 having end taps 118, 120 and a center tap 122, center tap 122 being coupled to ground or reference potential as at 124. A pair of diodes 130, 132 each have their cathodes connected to end taps 118, 120, respectively, and their anodes connected in common as at 134. Diodes 130, 132 are further connected to negative terminal 20, diodes 130, 132 functioning as a full-wave rectifier to rectify the signal received via output winding 116 from input winding 86. A filter capacitor 136 is connected between the anodes of diodes 130, 132 and ground.

The circuit 10 as described thus far provides a complete, portable power supply for operating a small, portable, hand-held calculator circuit. A positive polarity source is provided at positive terminal 16 directly from batteries 32 and a negative polarity source is provided at negative terminal 20 by means of the "chopper" circuit 60.

To provide a means for charging the batteries 32 and to provide an alternative source of power for operating the calculator circuit (not shown) when the same is being used at a location at which standard 120 volt, 60 cycle alternating current power is available, there is provided the charging module 14. Module 14 includes a step-down transformer 150 having an input winding 152 which has connected thereto suitable plug means 154 for connecting input winding 152 to a standard 120 volt AC power source. The output winding 156 of transformer 150 has oppositely disposed end taps 158, 160. Connected across taps 158, 160 is a full-wave diode rectifier 162 which comprises four diodes 164, 166, 168, and 170 connected together in conventional manner. Rectifier circuit 162 includes output terminals 172, 174 which are connected to a reference buss 176 and a positive buss 178, respectively.

Module 14 is provided with a male plug indicated by dashed lines 180, plug 180 being complementary to female plug 36. Plug 180 includes three pins 182, 184, and 186 which electrically connect to sockets 38, 40, and 42, respectively, when the plugs 36 and 180 are engaged.

Plug 180 is further provided with an operating pin 188 (shown in dashed lines) which operatively engages armature 24 of switch 26 when plugs 36 and 180 are engaged. It will be observed that pin 188 moves armature 24 from its normal position in which it electrically contacts contact 28 and a second position in which armature 24 is in electrical contact with contact 50.

Module 14 further includes a filter circuit 200 which includes a filter capacitor 202, resistor 204, zener diode 206, and capacitor 208. Capacitor 202 is connected between positive buss 178 and reference buss 176, resistor 204 and zener diode 206 are connected electrically in series between positive buss 178 and reference buss 176, and capacitor 208 is connected between the commonly connected terminal 210 of resistor 204 and zener diode 206. A transistor 212 has its base 214 connected to terminal 210, its collector 216 connected to positive buss 178, and its emitter 218 connected to pin 184. A load resistor 220 is connected electrically in series between positive buss 178 and pin 182.

It will now be seen that, when module 14 is engaged with module 12, switch 26 will be operated such that its armature 24 is in electrical contact with contact 50. With means 154 connected to a 120 volt AC outlet, the alternating voltage therefrom will be stepped down by transformer 150, rectified by rectifier circuit 162, filtered by filter circuit 200 with a positive, direct current potential being applied from the latter to pin 182. This potential in turn is applied via socket 38 to the positive terminal of batteries 32 thereby charging the same.

Simultaneously, with module 14 energized, transistor 212 is rendered conductive. Correspondingly, positive direct current potential is applied to pin 184 via the collector 216 and emitter 218 thereof. This potential in turn is applied to the positive terminal 16 of module 12 by a socket 40, contact 50, armature 24, and "off-on" switch 22.

It will further be observed that zener diode 206 and transistor 212 function as a regulator to regulate the potential of the voltage appearing at pin 184. Specifically, an increase in the voltage appearing on positive buss 178 will effect an increase in the potential applied to collector 216 while the potential at base 214 is "locked" by zener diode 206. This in turn increases the collector to base potential difference and reduces the conductivity of transistor 212, increasing the potential drop thereacross, to thereby maintain the potential at pin 184 relatively constant.

From the above description it can be seen that the power supply of the present invention provides a highly efficient means for generating both positive and negative polarity sources for the operation of portable electronic equipment such as a portable, hand-held calculator circuit. The power supply circuit provides positive and negative sources having substantially different power requirements and capabilities in accordance with the requirements of the circuit being supplied. Because the source having the higher power requirements is provided directly from the batteries without the use of additional circuit components, power losses are minimized. Similarly, the provision of a "chopper" circuit to provide a power source of opposite polarity and having a lower power requirement which is operated from the batteries eliminates the need for additional battery cells, battery cells of different types, and, because the "chopper" circuit is utilized to generate the source having a lower power requirement, power consumption by the circuit is again minimized.

Further, the novel power supply of the present invention provides a simple yet effective means for simultaneously operating a circuit from an alternating current power source when such is available and, simultaneously therewith, provides a means for charging the batteries in the battery energized power supply circuit.

In a specific embodiment of the invention the following circuit values were used:

| | |
|---|---|
| Transistors 70, 72 | 2N3904 |
| Transistor 212 | TIP29 (Texas Instruments) |
| Diodes 44, 166 | 1N4001 |
| Diode 56 | 1N34A |
| Diodes 130, 132 | 1N4148 |
| Zener Diode 206 | SZ 8.2 (Schauer) |
| Resistors: 92 | 12 K ohms |
| 204 | 270 ohms |
| 220 | 27 ohms |
| Capacitors: 54 | 6.8 Microfarads |
| 94 | 0.1 Microfarads |
| 114 | 0.001 Microfarads |
| 136 | 6.8 Microfarads |
| 202 | 400 Microfarads |
| 208 | 250 Microfarads |
| Transformer 88: winding 110 | 14 turns with center tap |
| winding 86 | 80 turns with center tap |
| winding 116 | 90 turns with center tap |
| Transformer 150 | 115 volts A. C. input |
| | 10 volts A. C. output |
| Battery Cells 32 | AA Nickel/Cadmium (6 units) |
| Output at terminal 16 | +7.2 volts D.C., 250 MA. max. |
| Output at terminal 20 | −7.2 volts D.C., 20 MA. |

While there have been described above the principles of this invention in connection with specific apparatus, it is to be clearly understood that this description is made only by way of example and not as a limitation to the scope of the invention.

What is claimed is:

1. For use in a portable, hand-held calculator, a power supply comprising positive, negative, and reference terminals, a plurality of batteries connected electrically in series between one of said positive and negative terminals and said reference terminal for producing at said one of said terminals a first direct current voltage of predetermined polarity, and means coupled to said batteries and between the other of said positive and negative and said reference terminals for generating at said other of said terminals a direct current voltage which is of a polarity opposite said predetermined polarity with respect to the voltage occurring at said reference terminal, said generating means including an oscillator circuit having an input circuit coupled to said positive terminal, an output circuit, a rectifier circuit, and means coupling said rectifier circuit to said output circuit, the current capacity of said generating means being substantially less than the current capacity of said batteries.

2. The power supply of claim 1 wherein said coupling means includes a transformer having an input and an output winding, said input winding having end taps and a center tap, said oscillator including a pair of transistors coupled in push-pull configuration to said end taps, said center tap being connected to said one of said terminals, said rectifier means being coupled to said output winding.

3. The power supply of claim 2 wherein said output winding includes two end taps and a center tap, said rectifier means including a full wave rectifier having two input terminals and an output terminal, said input terminal being connected to said last mentioned end tap, said output terminal being connected to said other of said terminals, said center tap being connected to said reference terminal, said transformer further including a feedback winding having end taps and a center tap, said transistors having their bases connected to opposite ones of said feedback winding end taps, respectively, there being a first capacitor coupled between said feedback winding end taps, a second capacitor connected between said common connected elements of said transistors and said feedback winding center tap and a resistor connected between said feedback winding and said input winding center taps.

4. For use in a portable, hand-held calculator, a power supply comprising positive, negative, and reference terminals, a plurality of batteries connected electrically in series between said positive terminal and said reference terminal, and means coupled to said batteries and between said negative and reference terminals for generating at said negative terminal a direct current voltage which is negative with respect to the voltage occurring at said reference terminal, said generating means including an oscillator circuit having an input circuit coupled to said positive terminal, an output circuit, a rectifier circuit, and means coupling said rectifier circuit to said output circuit, a charging circuit disengageably coupled to said power supply, said charging circuit including means for connecting said charging circuit to a source of alternating current, means coupled to said connecting means for generating a unidirectional, filtered current signal having a predetermined voltage level, means coupled to said generating means for regulating said voltage level, said regulating means including an output circuit, and means for simultaneously and selectively coupling said output circuit to said positive terminal and coupling said battery positive terminal to said generating means and disconnecting said battery positive terminal from said positive terminal when said module is coupled to said power supply and for connecting said battery terminal to said positive terminal when said module is disconnected from said power supply.

5. The power supply of claim 4 wherein said coupling means includes a single-pole, single-throw switch having first, second, and common contacts, said common contact being connected to said positive terminal, said first contact being connected to said battery positive terminal, said second contact being disengageably connected to said output circuit, said battery connecting means including a diode having its cathode connected to said battery positive terminal and a resistor connected in series between said signal generating means and the anode of said diode.

6. The power supply of claim 5 wherein said regulating means includes a resistor and a zener diode connected electrically in series between said signal generating means and said reference terminal, a transistor having its collector and emitter connected electrically in series between said generating means and said module positive terminal and its base connected to the cathode of said zener diode, and a capacitor connected between said base and said reference terminal.

7. The power supply of claim 5 wherein said coupling means further includes a multi-pin plug having selectively engageable male and female portions, said common contact being normally connected to said first contact, said plug including means for connecting said common contact to said second contact and disconnecting said common contact from said first contact when said male and female portions are engaged.

* * * * *